Jan. 12, 1960
R. V. BAKER
2,920,540
TAMPING VEHICLES
Filed Feb. 11, 1957
3 Sheets-Sheet 3
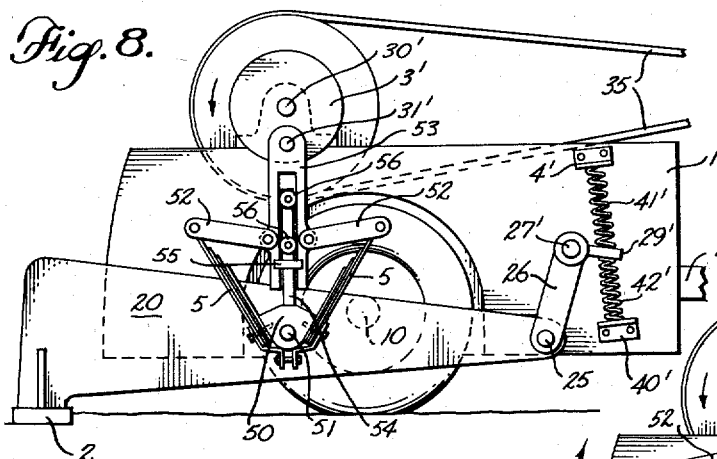
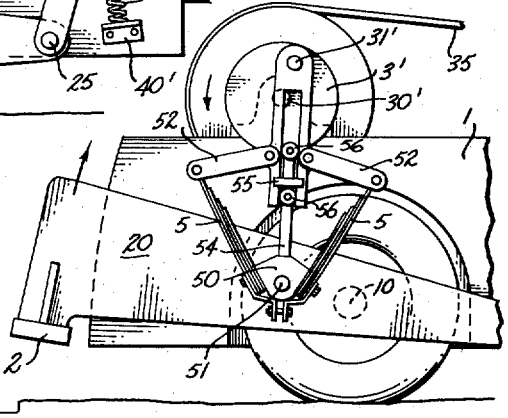
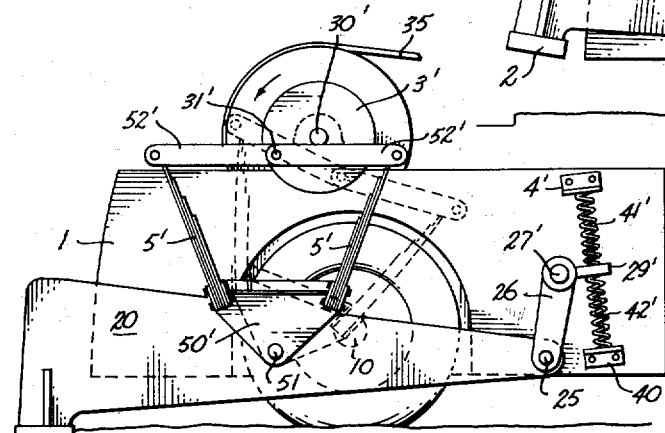
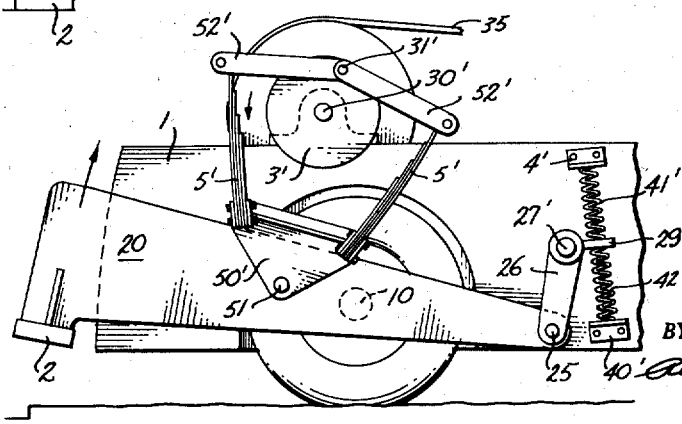
INVENTOR.
RHEA V. BAKER
BY
ATTORNEYS United States Patent Office 2,920,540
Patented Jan. 12, 1960

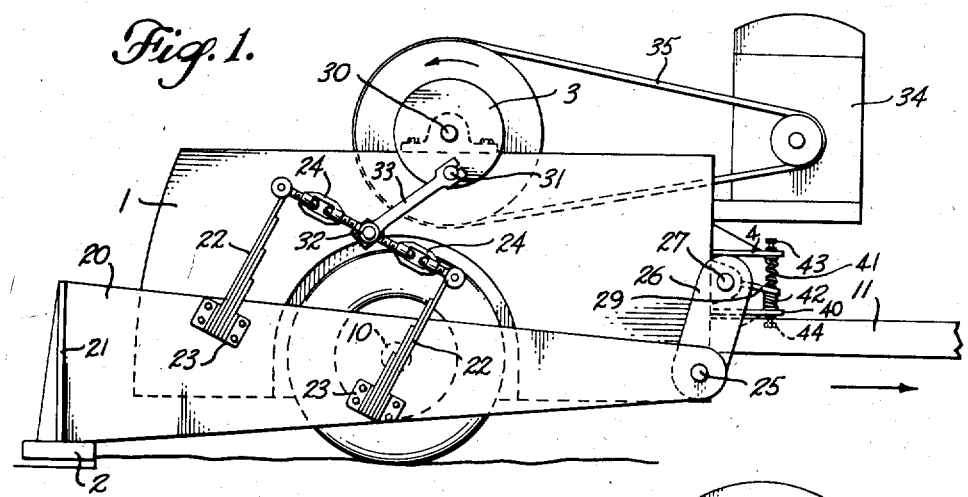
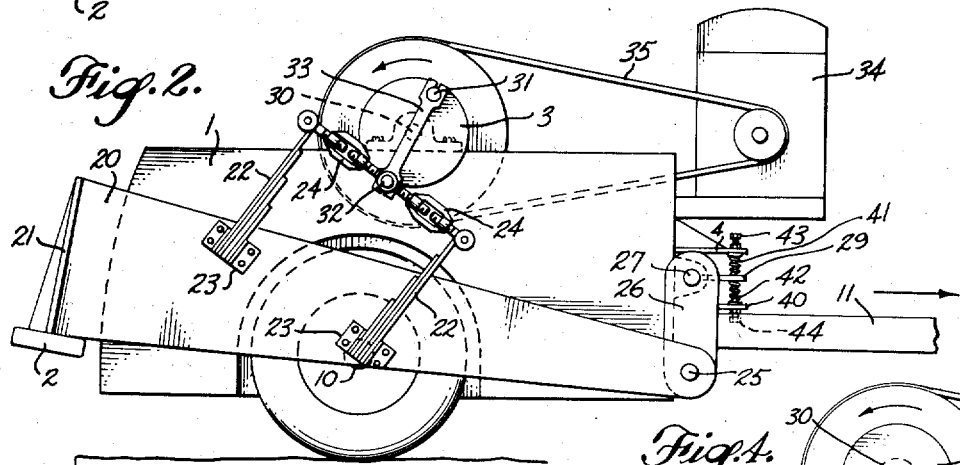
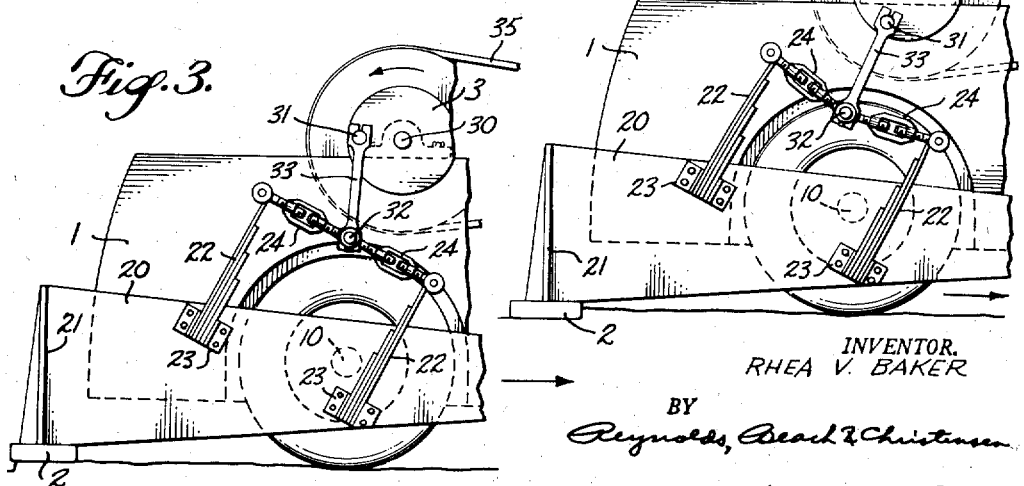

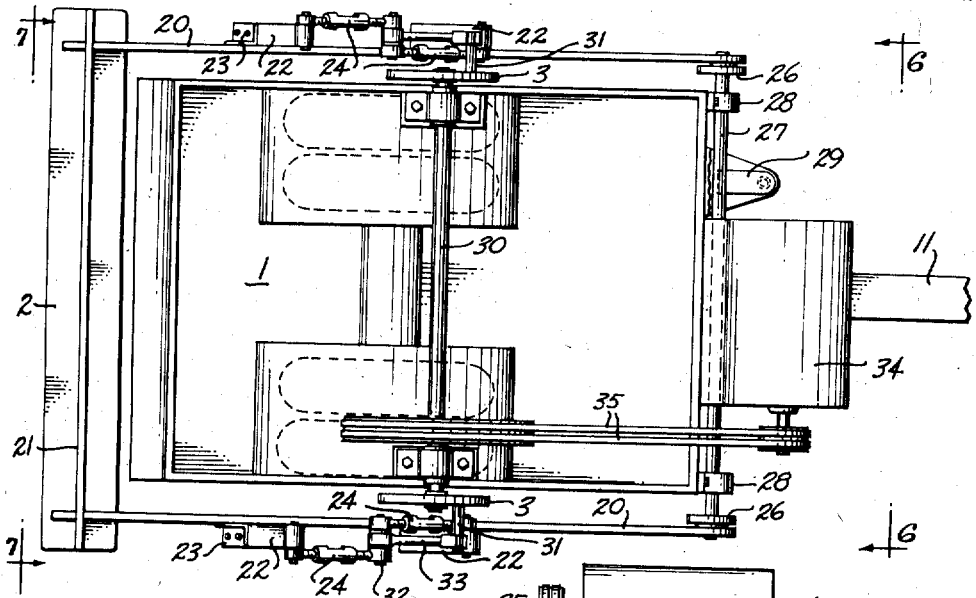
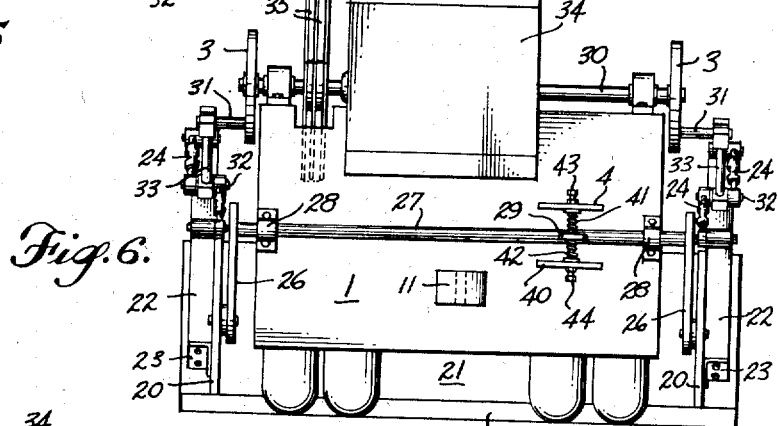
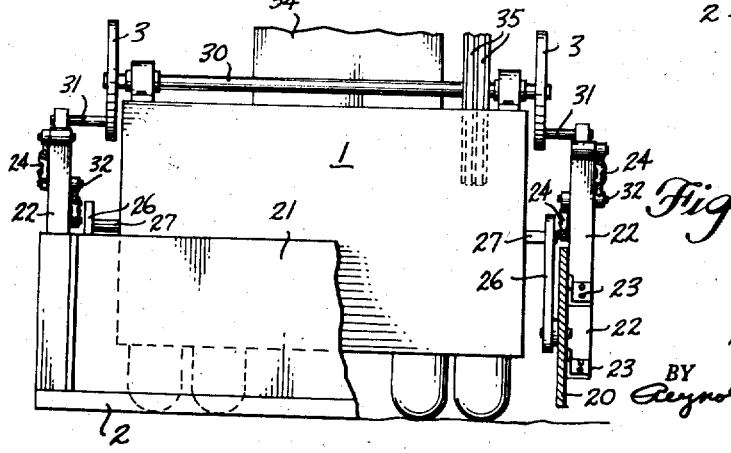

2,920,540
TAMPING VEHICLES
Rhea V. Baker, Seattle, Wash.
Application February 11, 1957, Serial No. 639,502
9 Claims. (Cl. 94—49)

The present invention relates to a vehicle equipped with mechanism for tamping ground such as for the purpose of packing it after grading and prior to the placing of ballast or surfacing in road construction. By the use of such a tamping vehicle the entire length of a strip the width of a tamping member can be compacted as the vehicle is moved over such strip. This application is a continuation in part of my previous application Serial No. 555,655, filed December 27, 1955, and now abandoned, for a tamping vehicle.

An important object of the invention is to provide such a vehicle which will effect greater compaction of the ground in a given time than has been possible heretofore. A further object is to effect such compaction in a manner which will leave a substantially smooth surface on the compacted area.

An additional object is to provide a tamping vehicle which will execute the tamping operation automatically and without attention of an operator of a tractor, for example, which pulls the vehicle. While the vehicle may be self-propelled, it is preferred that it be of the trailer type.

It is also an object to provide a tamping vehicle which can be designed or adjusted to provide the desired speed of tamping operation.

More specifically, it is an object to utilize a dynamic pounding type of tamping operation, in which each blow is regulated so that the compacting element will not rebound immediately from the blow, but a period of dwell is provided at the end of each downward stroke so that the compacted surface will not be disturbed by retraction of the compacting element too abruptly.

A more specific object is to provide tamping mechanism on a vehicle which will enable the vehicle to be moved continuously without dragging a compacting element along the ground in its lowered position despite the provision of a period of dwell at the end of each downward stroke.

Another object is to provide yieldable actuating mechanism for lost motion means which will enable a reciprocable compacting element to remain stationary for a moment at the end of its downward stroke, although both the vehicle and the compacting element drive mechanism continue to move uninterruptedly, and which further will restore a predetermined relationship between the compacting element and its drive mechanism and between the compacting element and the vehicle during the next stroke of the compacting element.

The foregoing objects can be accomplished by a vehicle of the trailer type which carries a vertically reciprocable compacting member driven by and mounted on the vehicle. The term "vertical" is used in the general sense of up and down, because it is preferred that the compacting element in the form of a tamping bar extending transversely of the vehicle behind it be supported by swingable arms extending along opposite sides of the vehicle. The drive mechanism will then swing these arms up and down so that the tamping bar may actually follow a substantially arcuate path rather than one which is strictly vertical. The arm-swinging drive mechanism will incorporate resilient lost motion connecting means enabling the arms to remain quiescent for an instant in their lowermost position despite continued movement of the arm drive mechanism. In addition, because of such dwell of the tamping bar at the bottom of its stroke, the arms are mounted on pivots which are movable relative to the vehicle so that, despite the momentary interruption in movement of the tamping bar supporting arms, movement of the vehicle over the ground may be continued uninterruptedly. Centering spring means control the positioning of the pivots for the tamping bar supporting arms so that as the tamping bar is raised following each impact the arm pivots will be restored to predetermined positions relative to the vehicle.

Figure 1 is a side elevation of a tamping vehicle showing the parts in their positions immediately following completion of the downward stroke of the tamping bar.

Figure 2 is a side elevation of the tamping vehicle similar to Figure 1, but showing the parts in the positions assumed when the tamping bar is in substantially its extreme upper position.

Figure 3 is a similar side elevation of the tamping vehicle, parts being broken away, with the parts in the positions occupied when the tamping bar has been moved downward sufficiently to make initial contact with the ground surface, and Figure 4 is a similar view showing the positions of the parts when the tamping bar has reached its lowermost position.

Figure 5 is a plan view of the tamping vehicle.

Figure 6 is a front elevation of the tamping vehicle as seen from line 6—6 of Figure 5, and Figure 7 is a rear elevation of the tamping vehicle as seen from line 7—7 of Figure 5, parts having been broken away.

Figure 8 is a side elevation of a modified form of tamping vehicle with the tamping bar in its lowermost position corresponding to the position of the bar in Figure 4.

Figure 9 is a side elevation of the same vehicle with parts broken away and with the tamping bar in substantially the fully raised position corresponding to the showing of Figure 2.

Figure 10 is a side elevation of a still further modified tamping vehicle showing the tamping bar in the lowermost position corresponding substantially to the illustration of Figure 4 and Figure 11 is a similar view with the tamping bar in its fully raised position corresponding to the showing of Figure 2.

In the past insufficient compaction was obtained or the operation was too slow when the ground surface was merely squeezed as is effected by the action of a roller, for example. A dynamic packing action, such as effected by mechanical tamping with the vehicle of the present invention, has overcome such objections. Such a tamping operation should be performed by an element which has a period of dwell at the end of a pounding stroke to effect consolidation of the pounded earth or other material to be compacted, instead of simply striking the material and releasing the pressure immediately. A tamping element mounted on a vehicle which is moved continuously over the ground should be controlled to prevent scraping the tamping element along the ground during the period of dwell for consolidating the material pounded.

The tamping vehicle shown in the drawings is a trailer type of vehicle, including the body 1 which is suitably mounted on a chassis supported by the single axle 10. Because such a vehicle is intended to carry considerable load and when loaded would be quite heavy, it is preferred that dual wheels support opposite ends of the axle as shown best in Figures 6 and 7. A tongue 11 by which the trailer can be pulled by a suitable tractor projects forward from the trailer chassis. The compacting member in the form of the tamping bar 2 extends transversely of the trailer behind it, and its opposite end portions respectively are supported by the trailing ends of the arms 20 extending along opposite sides of the trailer.

In order to effect a substantial compaction of ground, which term is intended to include not only earth but also roadbed material such as crushed rock, gravel, or similar material, the tamping bar must be quite heavy, must be moved up and down through a substantial vertical distance, and must be moved downward at a considerable speed prior to impact. Thus the tamping bar and its directly associated moving parts effective to produce the impact should weigh in the neighborhood of four thousand pounds. For a vertical stroke of eight to twelve inches the speed of the tamping bar movement may be approximately two cycles per second. It will be evident, therefore, that the impact of the tamping bar on the ground will produce a heavy pounding action, and, conversely, the tamping bar structure will be subjected to considerable stress. Consequently, it should be of rugged construction and therefore includes the deep web 21 which supports and stiffens the tamping bar 2 proper throughout its length.

The drive mechanism for swinging the tamping bar 2 upward and downward may include the disk cranks 3 mounted on opposite end portions of a crankshaft 30, and each carrying a crankpin 31. On each arm 20 is mounted a pair of parallel leaf springs 22 which are secured to the arm in cantilever fashion by anchor clamps 23. The free ends of such springs are interconnected by members adjustable in effective length, such as turnbuckle links 24, which cooperate preferably in the form of a toggle joint. These members when aligned are substantially perpendicular to the springs 22, and approximately in alignment with the pivot 25 of the arm 20.

The toggle joint mechanism has its central pivot 32 connected to the crankpin 31 by a connecting rod 33. The toggle joint 24, 24 thus constitutes a yoke variable in effective length by which thrust may be transmitted through connecting rod 33 from the disk crank 3 to the parallel springs 22 mounted on the arm 20. By the thrust thus transmitted each arm will be swung about its pivot 25 and such arms will be swung conjointly if the crankpins 31 are similarly oriented. The vertical stroke of the tamping bar 2 will be determined by the throw of the crankpins. In order that the thrust transmitted by the springs 22 act in compression as nearly as possible rather than in bending to any appreciable extent, it is preferred that the crankshaft 30 be located so that a line joining it and the toggle joint pivot 32 is approximately parallel to and midway between the springs 22.

While, as mentioned above, the throw of the crankpin 31 will determine the degree of vertical movement of the tamping bar 2, the distance between the shaft 30 and the toggle joint 24, 24 in the extreme positions of movement of the arms and the length of the connecting rod 33 will establish the location of the range of movement executed by the tamping bar. Thus the higher shaft 30 is located, the farther crankpin 31 is located from such shaft and the shorter the connecting rod, the higher will be the range of movement of the tamping bar. In order to effect proper consolidation of the ground, however, as has been discussed above, it is desirable for the tamping bar to dwell for an instant at the bottom of each stroke. Such operation requires that the connecting rod 33 be able to continue its downward movement driven by the crankpin 31 after the tamping bar and arms 20 have come to rest. The toggle joint 24, 24 enables the movement of the connecting rod to continue between the positions shown in Figures 3, 4 and 1, because of the lost motion action of the toggle joint and spring combination and the resilience of the springs 22.

Other types of lost motion mechanism could be substituted for the toggle joint and spring combination. Moreover, adjustment in the length of the toggle joint links could be afforded by mechanism other than the turnbuckles shown. Such links could, for example, have several holes in one end or the other, which could be selectively engaged with the common pivot 32 or the pivot connecting the opposite ends of the toggle joint links with the eyes of the springs 22. While it is preferred that the length of links 24 be such that the springs 22 normally will assume substantially unstressed parallel relationship, it may be desirable in some cases to prestress the spring 22 by adjusting the length of links 24 either to draw the ends of such springs closer together or to move them farther apart upon initial adjustment.

Assuming that the length of the toggle joint 24, 24, the stroke of the disk crank 3, and the length of the connecting rod 33 have been selected such that the tamping bar 2 engages the ground, as shown in Figure 3, approximately sixty degrees before the crankpin 31 has moved into its position closest to the toggle joint, the tamping bar will move downward a relatively small distance, while the lost motion action of the toggle joint accommodates the further lengthwise movement of the connecting rod 33 into its position shown in Figure 4. At that time the tamping bar has been depressed to its fullest extent and the deflection of the toggle joint links from alignment has enabled the tamping bar to remain stationary for a moment during continued rotation of the disk crank 3. As the crank continues to turn through an additional 30 degrees or so to the position of Figure 1, the dwell of the tamping bar to consolidate the earth will be terminated and upward movement of the tamping bar will be initiated.

Since the vehicle 1 will continue to move in the direction indicated by the arrows in Figures 1 to 4, inclusive, during the dwell of the tamping bar between the positions shown in Figures 3, 4 and 1, a further lost motion connection must be provided between the tamping bar supporting arms 20 and the vehicle 1 if dragging of the tamping bar along the ground is to be prevented. Such lost motion adjustment between the arms 20 and the vehicle is permitted by supporting the pivots 25 of arms 20 on the lower ends of upright links 26, the upper ends of which links are mounted on the forward portion of the vehicle by shaft 27. When the tamping bar 2 first engages the ground in the position of Figure 3, the lower ends of the links 26 and the arms 20 will be in their most forward position relative to the vehicle, as illustrated in Figure 2. As the tamping bar remains in contact with the ground without being dragged and the vehicle continues to move forwardly, the upper ends of links 26 will be moved forward relative to their lower ends and arms 20 to the position shown in Figure 1.

Because of the compaction of the ground effected by the impact of the tamping bar 2 on it, a shoulder in the ground of greater or lesser height will be formed immediately ahead of the tamping bar upon completion of its downward stroke, as shown in Figure 1. It is necessary for the tamping bar to be moved upward above this shoulder before it can move forward for the next stroke. It is important, however, for the tamping bar to be moved forward positively thereafter during its upward movement so that upon each downward impact the tamping bar will pound a different increment of ground. It is preferred that the disk cranks 3 rotate in the direction indicated by the arrow in Figure 1 so that the upward pull of the connecting rod will also have a forward component to shift the arms 20 forward as soon as the tamping bar has been raised above the ground shoulder, the arms in their upwardly swung positions occupying the positions shown in Figure 2.

As has been mentioned previously, it is preferred that the tamping bars be moved up and down quite rapidly in order to gain sufficient momentum for tamping the ground effectively. It is possible, therefore, that the forward component of the pull exerted by the connecting rod 33 will not shift the arms forward sufficiently rapidly to locate the tamping bar 2 properly for the next downward stroke. Moreover, if the links 26 were simply mounted loosely for swinging, the arms 20 might vibrate or oscillate undesirably in a fore and aft direction. Consequently, it is preferred that the swinging of links 26 be controlled positively, although yieldingly, and that such movement be damped to prevent undesirable fore and aft oscillation of the tamping bar supporting arms.

To control the attitude of arm-supporting links 26 it is preferred that the upper ends of such links be secured to shaft 27 for rotation therewith. As shown in Figures 5 and 6, this shaft is journaled in bearings 28. A tongue 29 is carried by and projects forwardly from this shaft at a convenient location between its ends. This tongue projects between brackets 4 and 40 above and below it respectively, and compression springs 41 and 42, respectively, are interengaged between the brackets 4 and 40 and the tongue 29.

As the disk crank 3 rotates in the direction of the arrow from the position of Figure 2, the tamping bar 2 is moved downward rapidly until it engages the ground. The lower spring 42 of the supporting link control mechanism is sufficiently stiff that it prevents the rearwardly directed thrust component of the connecting rod applied force from moving the tamping bar appreciably rearwardly during such downward movement. After the tamping bar contacts the ground, however, the downward thrust of the connecting rod will produce sufficient frictional engagement between the tamping bar and the ground as to cause the link 26 to be swung toward the position shown in Figure 1 in opposition to the force of spring 42 instead of dragging the tamping bar along the ground.

When the tamping bar is lifted clear of the ground shoulder which it has produced, however, the spring 42 will assist in swinging links 26 to move their lower ends forward, supplemented by the forward thrust component of the upwardly moving connecting rod 33. When the links have again reached the position shown in Figure 2, however, the spring 41 will resist further swinging of the links, and such springs will cooperate to maintain the links substantially stationary relative to the vehicle in the position of Figure 2 until the tamping bar has been fully raised and moved downward again into contact with the ground. The stress produced by springs 41 and 42 may be adjusted to accomplish this purpose by appropriate movement of the adjusting screws 43 and 44, respectively.

It will be evident that particularly because of the continued stress downward exerted on the arms 20 by the connecting rods 33 after the tamping bar has been stopped by impacting the ground, there will be considerable upward lifting force exerted on the vehicle. In order to stabilize the vehicle, therefore, it is preferable for it to be operated loaded with scrap metal, rock or gravel ballast. Thus the entire weight of the vehicle unloaded might be nine tons and three to four tons of ballast could be placed in the vehicle body for stability.

To obtain the rapid oscillation of the tamping bar described above while the vehicle is moved slowly over the ground, it is preferred that the disk crank 3 be rotated by an engine 34 provided specifically for driving the crankshaft 30 such as by a V-belt drive 35. As an alternative, however, it may be possible to gear the disk crank 3 by suitable reduction gearing to the vehicle wheels or axle 10 so that the crankshaft will be driven by rotation of the vehicle wheels as the vehicle is moved over the ground. In that case, however, considerably greater driving power would be required to move the vehicle and the tamping of the ground would be related definitely to the speed of movement of the vehicle over the ground, instead of the tamping action being independent of the vehicle speed so that more tamping would occur if the vehicle speed were decreased.

In the modified form of vehicle shown in Figures 8 and 9 the body 1, axle 10 and chassis construction would be substantially the same as in the vehicle described above. Also the tamping bar 2 and its supporting arms 20 would be of similar structure. Mechanism provided in this vehicle for supporting and moving such arms is of a different type, however.

As in the form previously described the forward ends of the arms 20 are supported from links 26 by pivots 25, but in this instance the shaft 27' does not extend transversely in front of the body 1 but either extends through the body or is divided so that the shaft elements 27' are stub shafts mounted on opposite sides of the body to carry the links 26 respectively. Swinging of the links is controlled by a tongue 29' secured to the upper end of each link 26 so as in effect to form a bell crank and such tongue is received between upper and lower springs 41' and 42' which bear against upper and lower brackets 4' and 40'. The links and centering spring arrangement operate to influence the fore and aft position of pivots 25 in a manner similar to that explained in connection with the vehicle previously described.

The principal difference of the modified vehicle shown in Figures 8 and 9 is in the drive mechanism for swinging the tamping bar supporting arms 20 up and down about the pivots 25. The crank mechanism itself employed in this vehicle is similar to that provided for the vehicle shown in Figures 1 to 7, inclusive, except that the disk crank 3', the crankshaft 30' and the supporting mechanism for such crankshaft are located farther rearwardly on the body 1 than in the vehicle of Figures 1 to 7. The crankshaft is driven by any suitable drive such as the belt 35 engaging a drive wheel on the crankshaft. The crankpin 31' may be spaced from the crankshaft 30' generally the same distance as the spacing between the crankshaft 30 and the crankpin 31 in the vehicle of Figures 1 to 7, inclusive.

The greatest difference between the modification of Figures 8 and 9 and that of Figures 1 to 7 is in the particular leaf spring and toggle joint mechanism connecting the crankpin 31' and the corresponding arm 20 on each side of the vehicle. In such connecting mechanism previously described the springs 22 were disposed substantially parallel and were connected to spaced locations on the tamping bar supporting arm. In the arrangement of Figures 8 and 9 the leaf springs 5 while still disposed generally upright are convergent downwardly and their lower ends are anchored to a single block 50 which is connected by pivot 51 to the tamping bar supporting arm 20. Consequently, the springs 5 may swing relative to the tamping bar supporting arm about pivot 51 as illutrated by the change in angular relationship between these parts effected by swinging of the tamping bar supporting arms between the lowered position of Figure 8 and the raised position of Figure 9.

The upper ends of the upright springs 5 are connected respectively by toggle joint links 52 to a connecting link 53, the upper end of which is secured to the crankpin 31'. Whether the toggle join links 52 are connected to the connecting link 53 by separate pivots as shown or by a single common pivot, the connecting link 53 could swing relative to springs 5 if no additional mechanism were provided. As the crank is rotated therefore the connecting link 53 would tend to remain in a vertical position as it moved downward which might cause the connecting link and the toggle linkage to buckle so as to place greatly unequal loads on the two springs 5. Since such a condition would be undesirable variable length guide mechanism is provided to keep the connecting link 53 always in line with the line joining the crankpin 31' and the pivot 51 securing the spring anchor block 50 to the tamping bar supporting arm 20.

The slide and guide mechanism may, as shown in Figures 8 and 9, include the formation of the connecting link 53 as a guide channel in which is received the slide rod 54 having its lower end secured to the spring anchor block 50. The rod 54 and guide channel 53 are held in engagement by a strap 55 bridging between the flanges of the connecting channel 53. Friction between the slide rod and guide channel as such guide mechanism varies in length between the most contracted condition of Figure 8 and the most extended condition of Figure 9 is minimized by providing rollers 56 on the slide rod which are spaced lengthwise of it. These rollers are of a diameter just slightly smaller than the width of the guide channel so that they will contact only one side or the other of such channel and yet such rollers are large enough to prevent any appreciable misalignment of the rod 54 and the guide channel of link 53.

As the crankshaft 30' is driven by the belt 35 in the direction indicated by the arrows in Figures 8 and 9, the tamping bar supporting arms 20 will be swung downward until the tamping bar engages the ground. The parts of the tamping bar drive mechanism will be proportioned so that ground contact of the tamping bar occurs a substantial period before the crankpin 31' has reached its lowest position shown in Figure 8. As the crankpin continues its downward movement, the toggle joint links 52 will be swung from a relationship somewhat similar to that shown in Figure 9 through aligned positions and into the positions inclined downwardly and toward each other shown in Figure 8 to produce a material consolidating dwell of the tamping bar 2. Such continued downward movement of the crankpin and swinging of the toggle joint links are permitted by the outward flexing of the upper ends of leaf springs 5. During such dwell period of the tamping bar as explained in connection with the first embodiment of the invention, the vehicle body 1 may continue forward to the right as seen in Figure 8 while the tamping bar remains stationary and the bell crank link 26, 29' swings in a clockwise direction about the shaft 27' to contract the lower centering spring 42'.

As the disk crank 3' continues to turn in the clockwise direction from the position of Figure 8 to the position of Figure 9 the tamping bar 2 will remain held against the ground without sliding and the body 1 of the vehicle will move farther to the right. Both such vehicle movement relative to the arms 20 and the continued turning of the disk crank 3' will cause the spring anchor block 50 to turn about its pivot 51 in a clockwise direction relative to the arm 20. The connecting link 53 will be swung correspondingly in a clockwise direction about pivot 51 so as to maintain such link in alignment with a straight line between the crankpin 31' and the pivot 51. Simultaneously the slide and guide mechanism 53, 54 will lengthen as the distance between such crankpin and pivot increases.

As the connecting link 53 moves away from the spring anchor block 50 the links 52 of the toggle joint will be swung relatively from the positions shown in Figure 8 past their positions of mutual alignment toward or into relative positions such as shown in Figure 9. As the links 52 swing past their mutually aligned positions they will begin to exert a lifting force on their tamping bar supporting arm 20 and when such force becomes great enough the tamping bar will be lifted clear of the ground. At that time the pressure exerted by spring 42' on tongue 29' of the bell crank lever 26, 29', exceeding the force of spring 41', will supplement the horizontal forward component of force exerted by the springs 5 on the arm 20 to shift the entire tamping bar supporting assembly forward until the pivot 25 of each arm 20 moves forward far enough so that the pressures exerted by the springs 41' and 42' on the tongue 29' are substantially equalized. Continued rotation of the disk crank 3' will move the crankpin 31' upward for lifting the connecting link 53, toggle joint and springs 5 to a position such as shown in Figure 9 in which the arms 20 have almost reached their uppermost position preparatory to driving the tamping bar 2 downward again for the next earth impacting stroke.

The vehicle shown in Figures 10 and 11 is more similar to the vehicle shown in Figures 8 and 9 than it is to the vehicle illustrated in Figures 1 to 7, inclusive. The only difference between these two devices is in the particular connecting mechanism between the crankpin 31' of the disk crank 3' and the pivot 51 on the arm 20 supporting one end of the tamping bar 2. The construction and operation of the other parts of this vehicle need not be repeated, therefore, but the various parts are numbered the same as the corresponding parts of the vehicle shown in Figures 8 and 9. Moreover the arrangement of the springs 5' in the arm drive connecting mechanism of Figures 10 and 11 is quite similar to the arrangement of springs 5 of the device shown in Figures 8 and 9 in that such springs converge downwardly and are secured to a spring anchor block 50' pivotally mounted on the arm 20 by pivot 51.

The most specific difference of the crankpin and arm connecting mechanism of Figures 10 and 11 over that of Figures 8 and 9 is in the elimination of a connecting link between the crankpin and the toggle joint links 52'. Such modification is made possible by increasing the size of the spring anchor block 50' and perhaps increasing somewhat the length of the leaf springs 5' so that the upper ends of such springs will be raised into positions generally at the opposite sides of the disk crank 3'. When the upper ends of the springs 5' are thus disposed they may be connected directly to the crankpin 31' by the toggle joint links 52'. In order to obtain the desired dwell of the tamping bar 2 at the bottom of its stroke, however, the upper ends of springs 5' must be located a substantial distance above the lowermost position of crankpin 31' when the tamping bar 2 is in its lowermost position. Such location of the upper ends of springs 5' enables the rotary movement of the crankpin 31' by the disk crank 3' to swing the toggle joint links 52' to opposite sides of the mutually aligned positions shown in full lines in Figure 10.

As the crankpin 31' rotates in the counterclockwise direction indicated in Figure 10 from the position of Figure 11 to the position of Figure 10 the tamping bar supporting arm 20 will be swung downward about pivot 25. As the tamping bar strikes the ground the continued downward movement of crankpin 31' will swing toggle joint links 52' into the aligned position of Figure 10 and then into a downwardly bent position while the upper ends of springs 5' are swung outward. From the time the tamping bar 2 first engages the ground until the crankpin 31' has reached the broken line position shown in Figure 10 the tamping bar will be pressed downward to compact the material struck. As the crankpin 31' continues to rotate from the broken line position shown in Figure 10 to the full line position of Figure 11 the toggle joint links 52' will be swung from the broken line position of Figure 10 through an aligned position into the upwardly inclined position of Figure 11. During such movement the tamping bar 2 will be raised to its uppermost position shown in Figure 11 by the upward swinging of the tamping bar supporting arm 20.

While, in the foregoing discussion, the operation of the lifting mechanism for only one arm 20 has been described it will be understood that the same type of disk crank and connecting mechanism will be duplicated at opposite ends of the crankshaft 30' as indicated by Figures 5, 6 and 7. Consequently, whether the connecting mechanism shown in Figures 8 and 9 or the connecting mechanism shown in Figures 10 and 11 is used, both arms 20 at opposite sides of the vehicle body 1 will be raised and lowered in unison to swing the tamping bar 2.

I claim as my invention:

1. A tamping vehicle comprising a wheeled chassis, a horizontal tamping bar extending transversely of said wheeled chassis and located behind it, two generally horizontal supporting arms disposed respectively along opposite sides of said chassis and having their rearward ends supportingly connected to opposite end portions of said tamping bar, upright links having their upper ends pivotally connected to said wheeled chassis and their lower ends pivotally connected to the forward ends of said arms, a pair of generally upright cantilever leaf springs having their lower ends mounted respectively on each of said arms and projecting upwardly therefrom, driven crank means carried by said chassis above said arms, and linkage means connecting the upper ends of the springs of each pair and said crank means for effecting upward and downward swinging of said arms and said tamping bar carried thereby by rotation of said crank means, said links being swingable relative to said wheeled chassis and said arms by translation of said wheeled chassis along the ground while movement of said tamping bar and said arms horizontally is arrested by contact of said tamping bar with the ground.

2. A tamping vehicle comprising a wheeled chassis, a horizontal tamping bar extending transversely of said wheeled chassis and located behind it, two generally horizontal supporting arms disposed respectively along opposite sides of said chassis and having their rearward ends supportingly connected to opposite end portions of said tamping bar, upright links having their upper ends pivotally connected to said wheeled chassis and their lower ends pivotally connected to the forward ends of said arms, a spring anchor block pivotally mounted on each of said arms between the upright link connected thereto and said tamping bar, a pair of generally upright cantilever leaf springs having their lower ends anchored on each of said spring anchor blocks and projecting divergently relative to each other upwardly therefrom, driven crank means carried by said chassis above said arms, and linkage means connecting the upper ends of the springs of each pair and said crank means for effecting upward and downward swinging of said arms and said tamping bar carried thereby by rotation of said crank means, said links being swingable relative to said wheeled chassis and said arms by translation of said wheeled chassis along the ground while movement of said tamping bar and said arms horizontally is arrested by contact of said tamping bar with the ground.

3. Compacting mechanism comprising a tamping member, generally horizontal pivoted arm means supporting said tamping member and guiding it for upward and downward movement, driving means including a crank, and thrust-exerting means interconnecting said crank and said pivoted arm means and including a pair of spaced leaf springs projecting upwardly from said pivoted arm means, each leaf spring of said pair having one end secured to said pivoted arm means, and a toggle joint connected between the other ends of said leaf springs and said crank.

4. Compacting mechanism comprising a tamping member, and tamping member supporting mechanism including swingable, generally horizontal arm means mounting said tamping member, a pivot for mounting said arm means, driving crank means, a connection interconnecting said arm means and said driving crank means, effecting upward and downward movement of said arm means and said tamping member by rotation of said driving crank means, and including a spring anchor block pivotally connected to one of said means, a pair of substantially straight, generally upright cantilever leaf springs having their fixed ends anchored to said block and projecting divergently relative to each other therefrom, and a toggle joint connected to the free ends of said springs and pivotally connected to the other of said means.

5. A tamping vehicle comprising a wheeled body continuously movable along the ground, generally horizontal arm means extending lengthwise of the direction of movement of said body, a pivot supporting said arm means and guiding said arm means for swinging about the axis of said pivot, a ground-engageable tamping member carried by said arm means at a location spaced lengthwise thereof from said pivot, driving means carried by the wheeled body and movable upwardly and downwardly, a connection interconnecting said driving means and said arm means at a location closer to said pivot than the distance between said tamping member and said pivot, said connection being movable upward and downward by said driving means to swing said arm means and said tamping member upward and downward and including two substantially straight leaf springs having corresponding ends fixed relative to each other and carried by one of said means and linkage connecting the free ends of said springs to the other of said means and variable in effective vertical extent as said driving means continues to move after downward movement of said tamping member is stopped by contact with the ground, and means supporting said pivot on said body for limited movement relative to said body parallel to the direction of its movement, guiding said pivot for movement of said body relative to said pivot, said arm means and said tamping member while said body continues to move along the ground and horizontal movement of said arm is arrested with said tamping member dwelling in contact with the ground, and guiding said pivot for movement of said pivot, said arm means and said stamping member generally lengthwise of said arm means relative to said body when said arm means and said tamping member are lifted by said driving means and said connection.

6. A tamping vehicle comprising a wheeled body continuously movable along the ground, generally horizontal arm means extending lengthwise of the direction of movement of said body, a pivot supporting said arm means and guiding said arm means for swinging about the axis of said pivot, a ground-engageable tamping member carried by said arm means at a location spaced lengthwise thereof from said pivot, driving means carried by the wheeled body and movable upwardly and downwardly, a connection interconnecting said driving means and said arm means at a location closer to said pivot than the distance between said tamping member and said pivot, said connection being movable upward and downward by said driving means to swing said arm means and said tamping member upward and downward and including two substantially straight leaf springs having corresponding ends fixed relative to each other and carried by one of said means and linkage connecting the free ends of said springs to the other of said means and variable in effective vertical extent as said driving means continues to move after downward movement of said tamping member is stopped by contact with the ground, and upright link means pivotally connected to said body at a location spaced from said pivot, mounting said pivot for limited movement relative to said body parallel to the direction of its movement, guiding said pivot for movement of said body relative to said pivot, said arm means and said tamping member while said body continues to move along the ground and horizontal movement of said arm is arrested with said tamping member dwelling in contact with the ground, and guiding said pivot for movement of said pivot, said arm means and said tamping member generally lengthwise of said arm means relative to said body when said arm means and said tamping member are lifted by said driving means and said connection.

7. The tamping vehicle defined in claim 6, and spring means interengaged between the wheeled body and the upright link means and urging the link means in a direction to move the pivot, arm means and tamping member relative to the wheeled body in the direction of movement of the wheeled body along the ground when the arm means and tamping member are lifted by the driving means.

8. A tamping vehicle comprising a wheeled body continuously movable along the ground, generally horizontal arm means extending lengthwise of the direction of movement of said body, pivot means supporting said arm means and guiding said arm means for swinging about the axis of said pivot means, a ground-engageable tamping member carried by said arm means at a location spaced lengthwise thereof from said pivot means, driving crank means carried by the wheeled body, two substantially straight, generally upright cantilever leaf springs having corresponding ends anchored relative to each other and connected to said arm means, linkage means connecting the free ends of said springs to said driving crank means and variable in effective vertical extent as said driving crank means continues to rotate after downward movement of said tamping member is stopped by contact with the ground, and means supporting said pivot means on said body for limited movement relative to said body parallel to the direction of its movement, guiding said pivot means for movement of said body relative to said pivot means, said arm means and said tamping member while said body continues to move along the ground and horizontal movement of said arm is arrested with said tamping member dwelling in contact with the ground, and guiding said pivot means for movement of said pivot means, said arm means and said tamping member generally lengthwise of said arm means relative to said body when said arm means and said tamping member are lifted by said driving crank means, said linkage means and said springs.

9. The tamping vehicle defined in claim 8, and a spring anchor block pivotally mounted on the arm means, the leaf springs having their lower ends anchored to said block and projecting divergently upward from said spring anchor block.

References Cited in the file of this patent

UNITED STATES PATENTS

| | | |
|---|---|---|
| 681,715 | Layne | Sept. 3, 1901 |
| 910,636 | Behmer | Jan. 26, 1909 |
| 1,819,866 | Cameron | Aug. 18, 1931 |

FOREIGN PATENTS

| | | |
|---|---|---|
| 51,406 | Denmark | Mar. 16, 1936 |
| 483,904 | Italy | Aug. 25, 1953 |
| 744,701 | Great Britain | Feb. 15, 1956 |